United States Patent [19]

Schwesig et al.

[11] Patent Number: 5,260,650
[45] Date of Patent: Nov. 9, 1993

[54] METHOD AND APPARATUS FOR DETECTING LOW ROTATIONAL SPEEDS USING A RESOLVER

[75] Inventors: Günter Schwesig; Albrecht Donat, both of Erlangen, Fed. Rep. of Germany

[73] Assignee: Siemens Aktiengesellschaft, Munich, Fed. Rep. of Germany

[21] Appl. No.: 768,911
[22] PCT Filed: Jun. 19, 1989
[86] PCT No.: PCT/DE89/00405
§ 371 Date: Oct. 2, 1991
§ 102(e) Date: Oct. 2, 1991
[87] PCT Pub. No.: WO90/15968
PCT Pub. Date: Dec. 27, 1990
[51] Int. Cl.⁵ .......................... G01P 3/46; G01P 3/52
[52] U.S. Cl. ........................ 324/163; 364/565
[58] Field of Search ............... 324/160, 163, 166, 165; 364/565

[56] References Cited

U.S. PATENT DOCUMENTS 4,225,931  9/1980  Schwefel ........................ 364/577

FOREIGN PATENT DOCUMENTS 2729697  1/1979  Fed. Rep. of Germany.
2942080  12/1982  Fed. Rep. of Germany.
3218101  11/1983  Fed. Rep. of Germany.
2061523  5/1981  United Kingdom.

OTHER PUBLICATIONS

Elektronik Industrie, Dec. 1985 (Heidelberg) Manfred Karcher: "R/D-Wandler im Vergleich zu Winkelcodierern und Tachogeneratoren", pp. 50, 52, 54.

Primary Examiner—Walter E. Snow
Attorney, Agent, or Firm—Kenyon & Kenyon

[57] ABSTRACT

A method and apparatus for generating a voltage ($u_{DK}$) proportional to the rotational-speed uses a resolver (2), which outputs two path-dependent or angle-dependent, amplitude-modulated (AM) sinusoidal voltages ($S_1$, $S_2$) in phase quadrature. The sinusoidal voltages have amplitudes that can be modulated depending upon the rotor position or the angle of rotation ($\alpha$), and can be tapped. According to the invention, a sinusoidal amplitude signal ($R_{L1}$, $R_{L2}$) dependent on the rotor position or the angle of rotation ($\alpha$) is extracted from the two AM sinusoidal voltages ($S_1$, $S_2$). These sinusoidal amplitude signals ($R_1$, $R_{L2}$) are converted into an approximated, sinusoidal signal ($R_{L1A}$, $R_{L2A}$), which is linear around the zero crossing in a range of ±45°. Each approximated, sinusoidal signal ($R_{L1A}$, $R_{L2A}$) is differentiated and subsequently inverted; and an analog rotational-speed-proportional voltage ($u_{DK}$) is formed which depends upon a detected rotor position ($\alpha$) from the two differentiated signals ($R'_{L1A}$, $R'_{L2A}$) and from the two inverted differentiated signals ($\overline{R}'_{L1A}$, $\overline{R}'_{L2A}$). This method and apparatus obtains a cost-effective method for detecting low rotational-speeds, which are measured by means of a resolver (2).

9 Claims, 11 Drawing Sheets

FIG 1

METHOD AND APPARATUS FOR DETECTING LOW ROTATIONAL SPEEDS USING A RESOLVER

BACKGROUND OF THE INVENTION

The invention relates generally to methods and apparatus for generating a voltage proportional to the rotational-speed with a resolver, and more specifically to such a method and apparatus whereby the sign of the rotational-speed-proportional voltage corresponds to the direction of rotation of the resolver, whereby two path-dependent or angle-dependent amplitude-modulated (AM) sinusoidal voltages in phase quadrature can be tapped at the two resolver outputs, and whereby the sinusoidal voltages have amplitudes that can be modulated as a function of the rotor position or the angle of rotation.

Brushless feed and main spindle drives are being used to an increasing degree for machine-tool drives. The measurement of speed and rotor position is likewise supposed to take place without brushes. For this purpose, one uses optical and magnetic incremental encoders, three-phase tachometers and resolvers, also called synchro-generators. To provide high positioning accuracy (position servo loop), the secondary speed control loop of a control and regulating unit associated with a feed and/or main spindle drive must have high rotational-speed resolution. Optical incremental encoders are already capable of acquiring the lowest detectable rotational-speed of $<0.01$ min$^{-1}$. For example, this type of incremental encoder produces 1,000 to 20,000 sine/cosine periods for each mechanical revolution. As an example, using an appropriate multiplication circuit one can then attain a positional resolution of 60 million positions per mechanical revolution. When a digital automatic speed control with a sampling time of 1 msec. is used, the rotational-speed is calculated from the difference between two rotor positions relative to the sampling time, whereby a rotational-speed of 0.01 min$^{-1}$ can be acquired with the indicated sampling time and resolution.

The periodical "Elektronik Industrie" [*Electronics Industry*] 12—1985, p. 50 to 54, discloses a resolver/-digital converter, which generates a digital angular value from the two resolver voltages by means of a tracking process. A phase-sensitive demodulator, an integrator and a voltage-controlled oscillator form a closed loop, in which the analog input angle is continually compared to the digital analog value. The resolution amounts to 16 bits per revolution and the angle information can be queried directly from a microprocessor. The resolver voltages are processed in the microvolt range through the application of a 16-bit digital-to-analog converter.

DE 32 18 101 C2 discloses an evaluation unit for a digital incremental encoder, in which two path-dependent or angle-dependent sinusoidal voltages in phase quadrature having identical amplitudes and periods can be tapped at the encoder outputs. These sinusoidal voltages can be converted into a number of pulses proportional to the path or angle covered. In addition, a voltage derived from a sinusoidal voltage can be converted into a digital value. Linear path-dependent or angle-dependent segments of the sinusoidal voltages in the area of the zero crossings are joined together electrically to form a periodic delta voltage, whose fundamental frequency is an integral multiple of the frequency of a sinusoidal voltage. The amplitude of the generated delta voltage has a linear correlation to the position within every eighth period of the encoder. By means of analog-to-digital conversion and linkage to comparator signals, which select the correct eighth periods, the subdivision of the encoder periods is facilitated.

A resolver is used in place of an optical encoder to detect rotational-speed and rotor position because the resolver is more cost-effective and sturdy, has a smaller unit volume and can be used in higher temperature ranges. However, the basic information of the resolver is several orders of magnitude lower than that of an optical encoder, and therefore must be analyzed using a costly evaluation circuit. These evaluation circuits usually contain expensive 16-bit analog-to-digital or digital-to-analog converters, whereby the processing in the microvolt range entails additional costs.

The present invention is directed to the problem of developing a cost-effective method for detecting low rotational-speeds, which can be measured by means of a resolver, and to the problem of developing an apparatus for implementing this method.

SUMMARY OF THE INVENTION

The present invention solves this problem by extracting a sinusoidal amplitude signal ($R_{L1}$, $R_{L2}$) that is dependent on the rotor position or the angle of rotation ($\alpha$) from the two path-dependent or angle-dependent AM sinusoidal voltages ($S_1$, $S_2$) in phase quadrature, that are output from the resolver and can be tapped at this output. The sign of the rotational-speed-proportional voltage ($U_{DK}$) corresponds to the direction of rotation of the resolver. These sinusoidal amplitude signals ($R_{L1}$, $R_{L2}$) are converted into an approximated sinusoidal signal ($R_{L14}$, $R_{L24}$), which is linear around the zero crossing in a range of $\pm 45°$. Each approximated sinusoidal signal ($R_{L14}$, $R_{L24}$) is differentiated and subsequently inverted. An analog voltage ($u_{DK}$) proportional to the rotational-speed is formed from the two differentiated signals ($R'_{L14}$, $R'_{L24}$) and the two inverted differentiated signals ($\overline{R}'_{L14}$, $\overline{R}'_{L24}$). This analog rotational-speed-proportional volta depends upon a detected rotor position ($\alpha$).

Using this method, one amplitude signal (also called a useful signal) whose amplitude is dependent upon the rotor position or the rotation angle, is first generated from the two AM sinusoidal voltages at the outputs of the resolvers. This means that the resolver signals are demodulated. A rotational-speed-proportional voltage is generated from the two amplitude signals resulting from the demodulation of the resolver signals. The amplitude signals are converted respectively into a sinusoidal signal, which is linear around the zero crossing in a range of $\pm 45°$. By differentiating (i.e. a pulse shaping process) these sinusoidal signals, one obtains two trapezoidal signals, whose amplitudes are proportional to the rotational-speed. A rotational-speed-proportional voltage that depends upon the rotor position or the rotation angle is then formed from the trapezoidal signals and the inverted trapezoidal signals. Its amplitude is proportional to the rotational-speed and the sign of this rotational-speed-proportional voltage corresponds to the direction of rotation of the resolver. By using a resolver, whose basic information is several orders of magnitude lower than that of optical incremental encoders, one can also detect a rotational-speed $<0.01$ min$^{-1}$ without using expensive analog-to-digital or digital-to-analog converters, which require processing in the microvolt range.

A method for performing the first process step of the present invention for generating the amplitude signals (useful signals) from the two AM sinusoidal voltages in phase quadrature at the outputs of the resolvers, generates an integrated AM sinusoidal voltage ($\bar{S}_1$, $\bar{S}_2$) from the AM sinusoidal voltages ($S_1$, $S_2$). Then, n phase-displaced sinusoidal voltages ($S_{11}$, $S_{12}$, ..., $S_{1n}$ or $S_{21}$, $S_{22}$, ..., $S_{2n}$) develop from the AM and the integrated AM sinusoidal voltages ($S_1$, $\bar{S}_1$ or $S_2$, $\bar{S}_2$) Finally, the amplitude signals ($R_{L1}$ or $R_{L2}$) are then filtered out.

Another method for performing the first process step of the present invention also generates an integrated AM sinusoidal voltage ($\bar{S}_1$, $\bar{S}_2$) from the AM sinusoidal voltages ($S_1$, $S_2$). Then, the AM and the integrated AM sinusoidal voltages ($S_1$, $\bar{S}_1$ or $S_2$, $\bar{S}_2$) are squared and added to form a composite signal ($S_{1s}$ or $S_{2s}$), from which the amplitude signal ($R_{L1}$ or $R_{L2}$) is generated through root extraction.

A third method for performing the first process step of the present invention again generates an integrated AM sinusoidal voltage ($\bar{S}_1$, $\bar{S}_2$) from the AM sinusoidal voltages ($S_1$, $S_2$) but where the AM and the integrated AM sinusoidal voltage ($S_1$, $\bar{S}_1$ or $S_2$, $\bar{S}_2$) have been rectified. These rectified sinusoidal voltages ($|S_1|$, $|\bar{S}_1|$ or $|S_2|$, $|\bar{S}_2|$) can be fed to a vector analyzer, which generates a rectified amplitude signal ($|R_{L1}|$ or $|R_{L2}|$) from the sinusoidal voltages. The rectified amplitude signal ($|R_{L1}|$ or $|R_{L2}|$) is then converted into the amplitude signal ($R_{L1}$ or $R_{L2}$).

An apparatus implementing the method of the invention uses a resolver which is fed on the rotor side by a cosinusoidal excitation voltage generated by a function generator. The resolver outputs and one of the function generator's outputs are coupled to a demodulating switching circuit. The outputs of the demodulating switching circuit are connected to a rotational-speed proportional voltage generator, which includes a characteristic generator followed by a differentiator for every resolver output. Within the rotational-speed proportional voltage generator, the outputs of the differentiator are connected directly to a multiplexer and also indirectly through an inverter to the multiplexer. Also within the rotational-speed proportional voltage generator, the multiplexer is followed by a analog-to-digital converter. In this way, control signals that are dependent on the rotor position can be fed to the address inputs of the multiplexer and the resolver outputs can be connected to a rotor position or an angle-or-rotation signal generator.

The signal generator has one output connected to a computing device and another output connected to a rotational-speed-proportional voltage generator. Control signals depending upon the rotor position and indicating in which angular range the rotor is situated are generated in a branch decoding logic and can be fed to the rotational-speed-proportional voltage generator. In this manner, one can determine the rotor-position angle-of-rotation of the resolver. Additionally, one can calculate the rotational speed from the difference between two rotor positions as a function of a sampling time of a digital speed control loop by means of the computing device. This apparatus enables one to detect the rotational speed of the rotary-position transducer and the rotor position or angle-of-rotation of the rotary-position transducer, using two different methods, from two amplitude signals extracted from two amplitude-modulated signals, which can be tapped off at the two resolver outputs. The invention allows one to detect the rotational speed at lower rotational speeds by using the rotational-speed-proportional voltage generator, and to detect the rotational speed at higher rotational speeds by using the rotor position generator. Both generators are designed to allow an overlap range within the rotational-speed bandwidth.

One embodiment of the demodulating switching circuit contains an integrator, a phase shifter, a multiplexer, and a filter circuit for every resolver output. The phase shifter has an input connected via the integrator to the resolver output and has another input connected directly to the resolver output. The n outputs of the phase shifter are connected to the multiplexer, whose output is linked to the filter circuit.

Another embodiment of the demodulating switching circuit features an integrator, two multipliers, an adder, and a root extractor for every resolver output. The first multiplier is linked directly to the resolver output, and the second multiplier is linked via an integrator to the resolver output. The outputs of the two multipliers are connected to the adder, whose output is linked to the root extractor.

A third embodiment of the demodulating switching circuit features an integrator, two absolute value generators, a vector analyzer, and a converter for every resolver output. The input of the first absolute value generator is linked directly to the resolver output and the input of the second absolute value generator is linked via the integrator to the resolver output. The two absolute value generators outputs are connected to the vector analyzer, whose output is connected to the converter.

DETAILED DESCRIPTION

Figure 1:
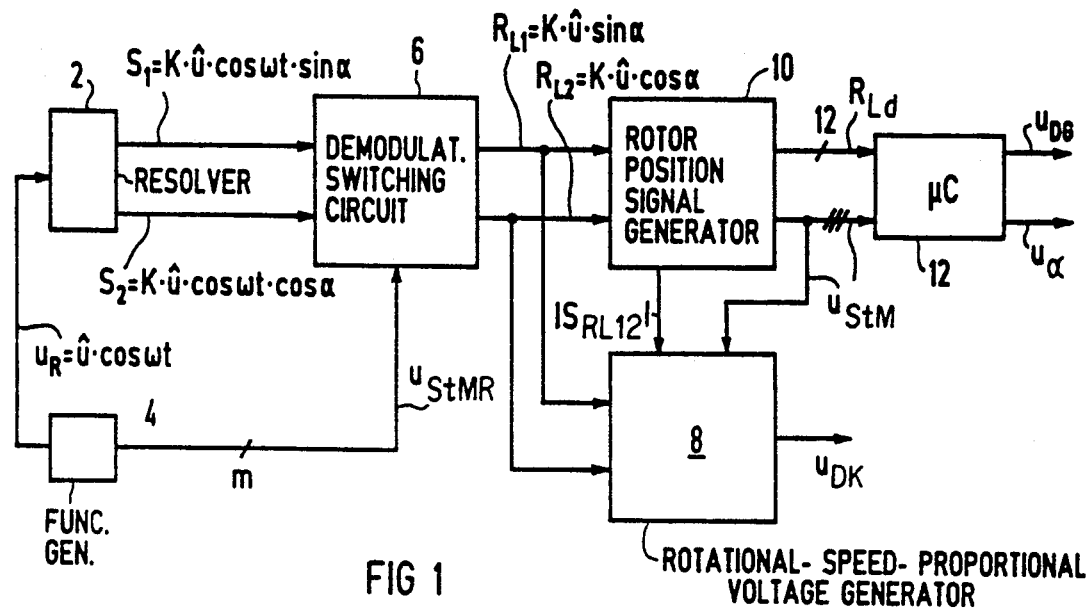
FIG. 1 depicts an apparatus for implementing the method according invention.

Referring to FIG. 1, an apparatus is shown for implementing a method according to the present invention for generating a rotational-speed-proportional voltage $u_{DK}$ and $u_{DG}$ with a resolver 2. On the rotor side, the resolver 2 is fed by a cosinusoidal inductor excitation voltage $$u_R = \hat{u} \cdot \cos \omega t$$

generated by a function generator 4. The design of the function generator 4 is depicted in greater detail in FIG. 5. Two path-dependent or angle-dependent AM sinusoidal voltages $$S_1 = K \cdot \hat{u} \cdot \cos \omega t \cdot \sin \alpha$$

$$S_2 = K \cdot \hat{u} \cdot \cos \omega t \cdot \cos \alpha$$

in phase quadrature can be tapped at both resolver outputs, where K is the voltage transformation ratio of the resolver 2. These sinusoidal voltages $S_1$ and $S_2$ are fed to a demodulating switching circuit 6, which is linked on the output side to a rotational-speed-proportional voltage $u_{DK}$ generator 8 and is also linked to a rotor-position $R_{Ld}$ or an angle-of-rotation $R_{Ld}$ signal generator 10.

From the AM sinusoidal voltages $S_1$ and $S_2$, the demodulating switching circuit 6 extracts two sinusoidal amplitude signals $$R_{L1} = K \cdot u \cdot \sin \alpha$$

$$R_{L2} = K \cdot u \cdot \cos \alpha$$

whose amplitudes change depending upon the rotor position or the angle of rotation. Advantageous specific embodiments of the demodulating switching circuit 6 are depicted in greater detail in FIGS. 2 to 4. A rotational-speed-proportional voltage $u_{DK}$ generator 8 is described in greater detail in FIG. 7. In addition, the magnitude of a composite signal $|S_{RL12}|$ and control signals $u_{StM}$ are fed to this rotational-speed-proportional voltage $u_{DK}$ generator 8. In addition to the rotor-position signal or the angle-of-rotation signal $R_{Ld}$, the magnitude of the composite signal $|S_{RL12}|$ and the control signals $u_{StM}$ are generated by the circuit 10, which is depicted in greater detail in FIG. 6 and is already disclosed by the European Patent Application with reference number 89105645.9 (GR 89 P 3145 E).

A processing circuit 12, or more particularly a microcomputer, is connected at the outlet side of the rotor-position or angle-of-rotation signal $R_{Ld}$ generator 10. The processing circuit 12 calculates a rotor-position-proportional voltage or angle-of-rotation-proportional voltage u and a rotational-speed-proportional voltage $u_{DG}$ from the rotor-position- or angle-of-rotation signal $R_{Ld}$ and the control signals $u_{StM}$. This rotational-speed-proportional voltage $u_{DG}$ is calculated in a well known way from the difference between two rotor positions relative to a sampling time.

To generate the sinusoidal amplitude signals $R_{L1}$ and $R_{L2}$, also called useful signals of the resolver output signals $S_1$ and $S_2$, control signals $u_{StMR}$, which are generated by the function generator 4, are fed to the demodulating switching circuit 6.

From the amplitude-modulated sinusoidal voltages $S_1$ and $S_2$ of a resolver 2, it is possible by means of the circuit in FIG. 1 to generate rotational-speed-proportional voltages $u_{DK}$ and $u_{DG}$, which correspond to a lower rotational-speed of 0.01 min$^{-1}$, in spite of the information content, which is several orders of magnitude lower. One can also use incremental encoders or rotary position transducers, which have two sinusoidal amplitude signals $R_{L1}$ and $R_{L2}$ in phase quadrature as their outputs, in place of the resolver 2 with the corresponding demodulating switching circuit 6 and the function generator 4.

Figure 2:
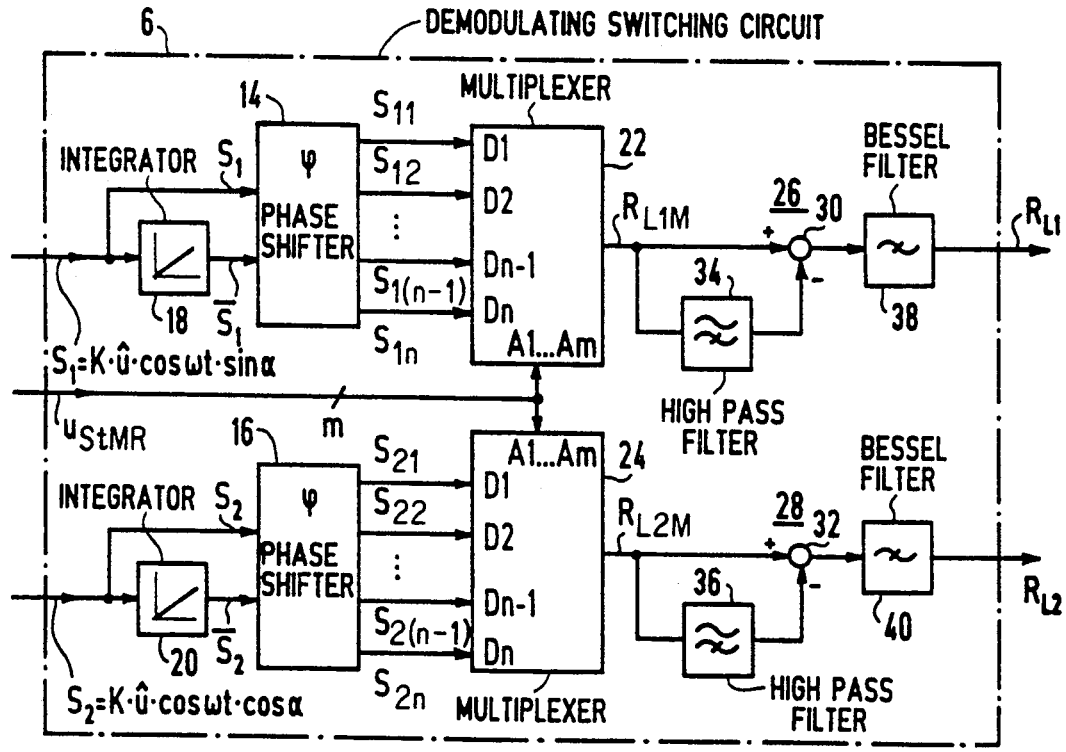
FIGS. 2 to 4 depict advantageous specific embodiments of demodulating switching arrangement of FIG. 1.
Figure 8:
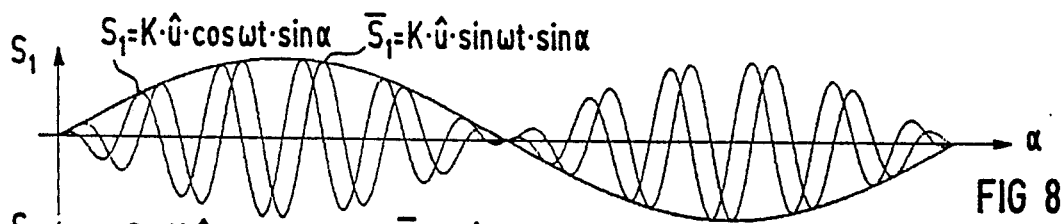
FIGS. 8 to 15 depict the signal patterns of the advantageous specific embodiments of the demodulating switching arrangement of FIG. 2, whereby the signals are shown as a function of the angle of rotation.
Figure 9:
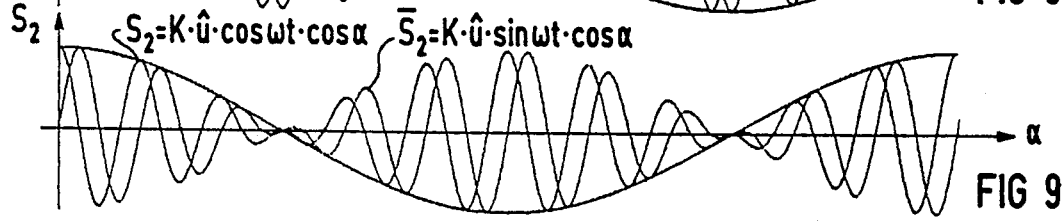
Figure 10:
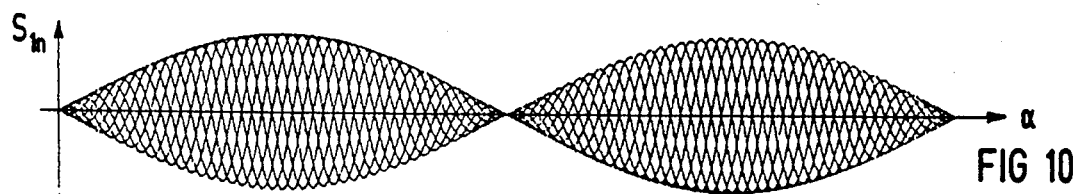
Figure 11:
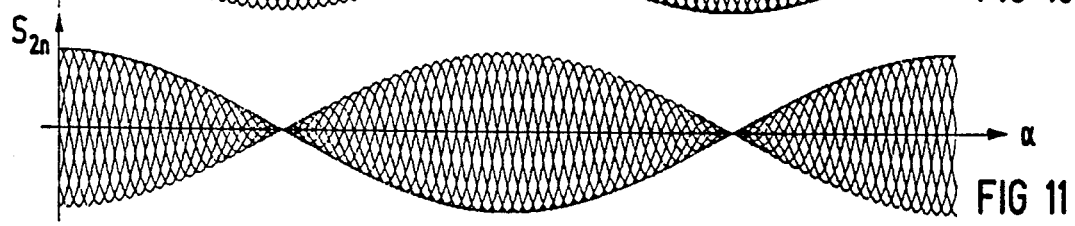
Figure 12:
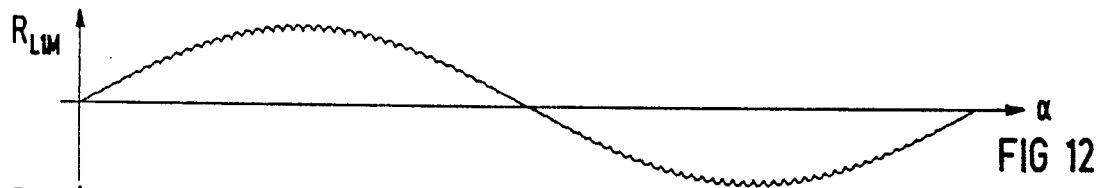
Figure 13:
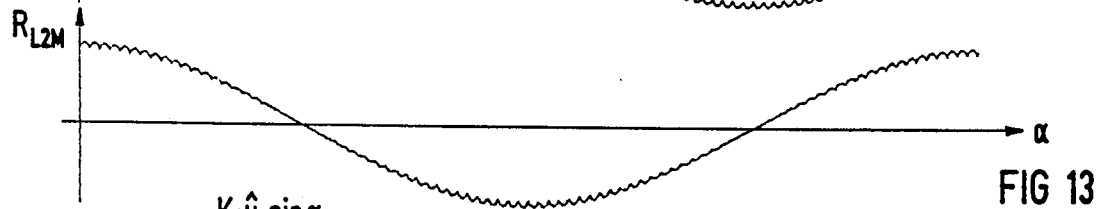
Figure 14:
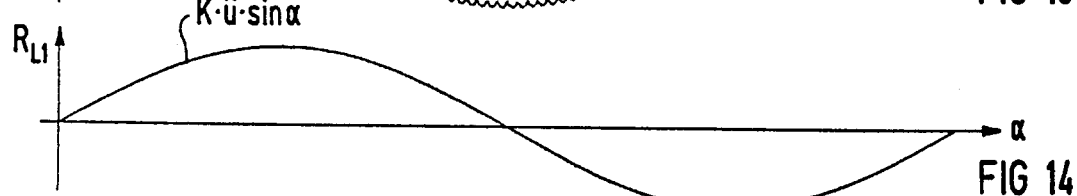
Figure 15:
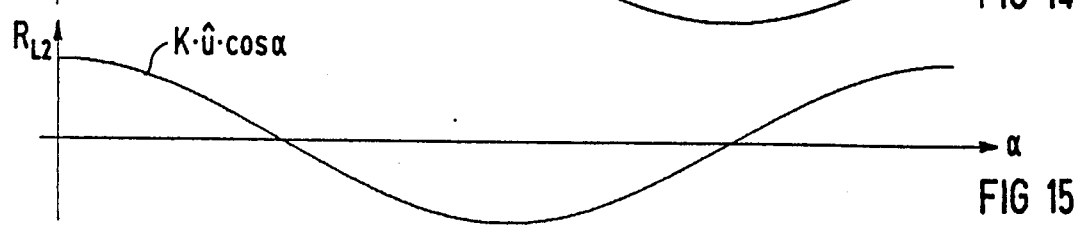

FIG. 2 shows an advantageous specific embodiment of the demodulating switching circuit 6 of FIG. 1. This specific embodiment of the demodulating switching circuit 6 has a two-channel design, and the channels have an identical construction. A resolver output signal $S_1$ or $S_2$ is fed to each channel of this demodulating switching circuit 6. This signal $S_1$ or $S_2$ is fed to a phase shifter 14 or 16 directly and via an integrator 18 or 20. Thus, the amplitude-modulated sinusoidal voltage $S_1$ or $S_2$ and the integrated, amplitude-modulated sinusoidal voltage $\bar{S}_1$ or $\bar{S}_2$ are applied to the inputs of the phase shifter 14 or 16. The sinusoidal voltage $S_1$ and $\bar{S}_1$ or $S_2$ and $\bar{S}_2$ are depicted 0 as a function of the angle of rotation $\alpha$ in FIG. 8 or 9. The phase shifter 14 or 16 generates phase-displaced sinusoidal voltages $S_{11}, S_{12}, \ldots, S_{1(n-1)}, S_{1n}$ or $S_{21}, S_{22}, \ldots, S_{2(n-1)}, S_{2n}$ at its outputs n. The greater the number n is, the smaller will be the ripple content of the sinusoidal envelope curve $R_{L1M}$ or $R_{L2M}$ generated by means of the multiplexer 22 or 24. The n phase-displaced sinusoidal voltages $S_{11}, S_{12}, \ldots S_{1n}$ or $S_{21}, S_{22} \ldots, S_{2n}$ are thereby linked to the data inputs D1, D2, ..., Dn of the multiplexer 22 or 24, whereby control signals $u_{StMR}$ are applied to the address inputs A1, ..., Am. The n phase-displaced sinusoidal voltages $S_{11}, S_{12}, \ldots, S_{1n}$ or $S_2, S_{22}, \ldots, S_{2n}$ are depicted as a function of the angle of rotation $\alpha$ in FIG. 10 or 11. The generated envelope curve $R_{L1M}$ or $R_{L2M}$ is likewise plotted as a function of the angle of rotation in FIG. 12 or 13. By means of a filter 26 or 28, the ripple content of the envelope curve $R_{L1M}$ or $R_{L2m}$ is filtered out, so that two sinusoidal amplitude signals $R_{L1}$ or $R_{L2}$ are output from the demodulating switching circuit 6. These amplitude signals are depicted as a function of the angle of rotation $\alpha$ in FIGS. 14 and 15. The filter 26 or 28 consists of an subtractor 30 or 32, which is supplied on the input side with the envelope curve $R_{L1M}$ or $R_{L2M}$ directly and via high-pass filter 34 or 36. On the output side, the subtracter 30 or 32 is linked to a Bessel filter 38 or 40, whereby the Bessel filter 38 or 40 is of the n-th order, preferably of the third order.

Figure 3:
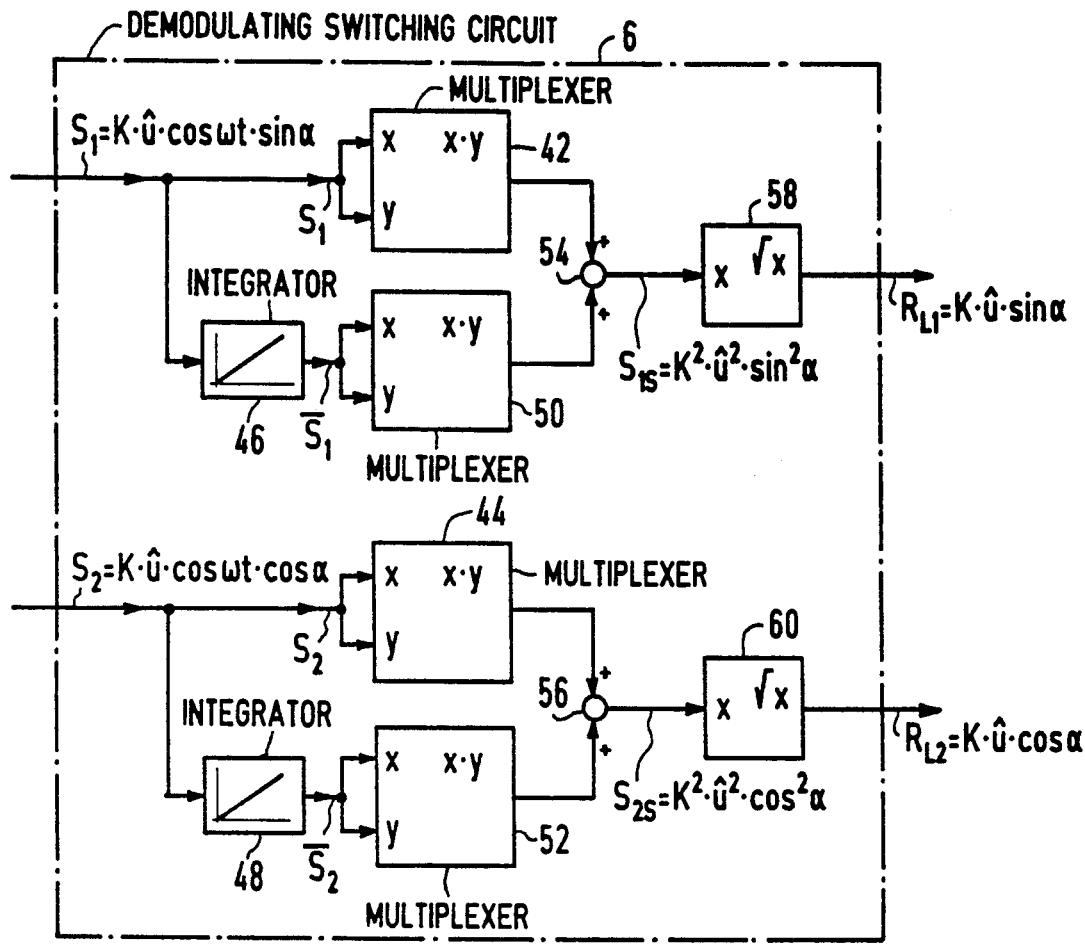

In FIG. 3, another advantageous embodiment of the demodulating switching circuit 6 according to FIG. 1 is depicted. This specific embodiment of the demodulating switching circuit 6 likewise has a two-channel design, and the channels have an identical construction. A resolver output signal $S_1$ or $S_2$ is fed to each channel of this demodulating switching circuit 6. This AM sinusoidal voltage $S_1$ or $S_2$ is fed directly to a first multiplier 42 or 44, which is operated as a squarer and via an integrator 46 or 48 to a second multiplier 50 or 52, which is likewise operated as a squarer. Since the time constant T of the integrator 46 or 48, according to FIG. 2, is equal to $1/\omega$, the integrated AM sinusoidal voltage $$\bar{S}_1 = K \cdot \hat{u} \cdot \sin\omega t \cdot \sin\alpha \text{ or}$$

$$\bar{S}_2 = K \cdot \hat{u} \cdot \cos\omega t \cdot \cos\alpha$$

is applied to the two inputs of the second multiplier 50 or 52. The output voltages of the two multipliers 42 and 50 or 44 and 52 are added, whereby the carrier-frequency content $$\cos\omega t + \sin\omega t$$

is eliminated at the output of the adder 54 or 56 based on the trigonometric formula $$\sin^2 + \cos^2 = 1$$

so that the summation voltage $$\bar{S}_{1s} = K^2 \cdot u^2 \cdot \sin^2\alpha$$

$$\bar{S}_{2s} = K^2 \cdot u^2 \cdot \cos^2\alpha$$

results. This summation voltage $\bar{S}_{1s}$ or $\bar{S}_{2s}$ is fed to a root extractor 58 or 60 with a converter stage, which outputs the sinusoidal amplitude signal $R_{L1}$ or $R_{L2}$ according to FIG. 14 or 15.

Figure 4:
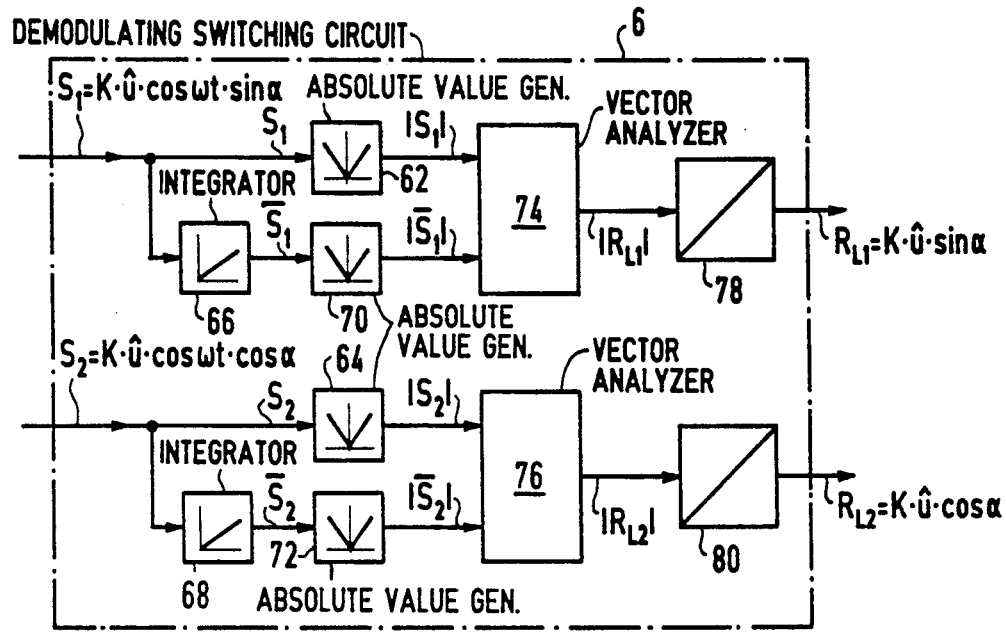

Another advantageous embodiment of the demodulating switching circuit 6 according to FIG. 1 is depicted in FIG. 4. This specific embodiment of the demodulating switching circuit 6 also has a two-channel design, and the channels have an identical construction. A resolver output signal $S_1$ or $S_2$ is fed to each channel of this demodulating switching circuit 6. This AM sinusoidal voltage $S_1$ or $S_2$ is fed via an absolute-value generator 62 or 64 and via an integrator 66 or 68 with a absolute-value generator 70 or 72 to a vector analyzer 74 or 76. In this manner, the magnitude of the AM sinusoidal voltage $|S_1|$ or $|S_2|$ and the magnitude of the integrated AM sinusoidal voltage $|\bar{S}_1|$ or $|\bar{S}_2|$ are available at both inputs of the vector analyzer 74 or 76. The vector analyzer 74 or 76 is depicted and described in the DE 31 20 319 C2, in particular in FIG. 5 with corresponding text. The vector analyzer 74 or 76 determines the magnitude $|R_{L1}|$ or $|R_{L2}|$ of a vector formulated from the magnitude $|S_1|$ or $|S_2|$ and $|\bar{S}_1|$ or $|\bar{S}_2|$. This amount $|R_{L1}|$ or $|R_{L2}|$ is converted by means of a converter 78 or 80 into a sinusoidal amplitude signal $R_{L1}$ or $R_{L2}$, which is the useful signal of the resolver output signal $S_1$ or $S_2$.

With these specific embodiments of the demodulating switching circuit 6, one can extract the sinusoidal amplitude signals $R_{L1}$ and $R_{L2}$ respectively, that is the useful signals, from the amplitude-modulated sinusoidal voltages $S_1$ or $S_2$ of the resolver 2. This extraction can be done without using expensive, high-resolution transducers, which would necessitate processing in the microvolt range, which is sensitive to malfunction. Thus, one obtains rugged demodulating switching circuits 6 for a rugged resolver 2, without having to accept the disadvantages associated with an information content that is several orders of magnitude lower than that achieved in the present invention.

Figure 5:
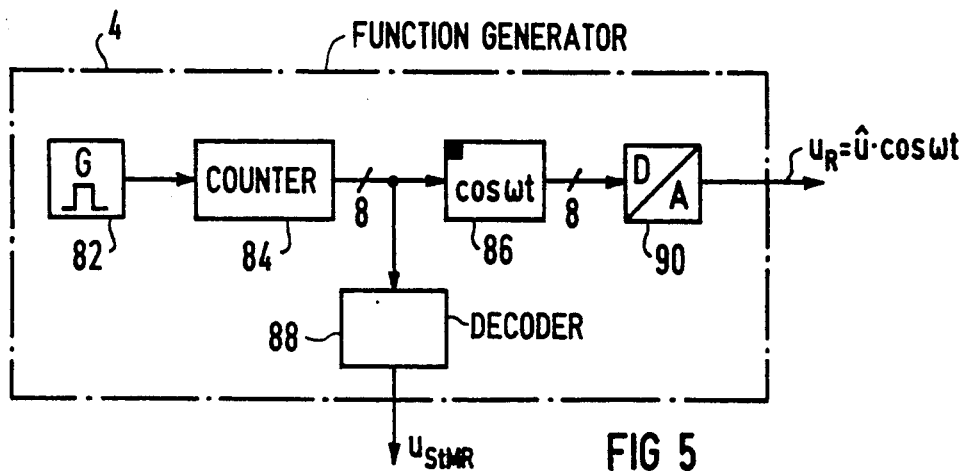
FIG. 5 shows the design of a function generator, which generates the inductor excitation voltage of the resolver.

FIG. 5 depicts the structure of a function generator 4, which generates the cosinusoidal inductor excitation voltage $$u_R = \hat{u} \cdot \cos\omega t$$

A generator 82 supplies clock signals to a counter 84. The output of the counter 84 is linked to a storage element 86, in which a cosine function is stored and to a decoder 88. A digital-to-analog converter 90, which outputs the inductor excitation voltage $u_R$ follows the storage 86. Depending upon the number n of the phase shifter 14 or 16 of FIG. 2, the decoder 88 generates m control signals $u_{StMR}$ for the address inputs A1 to Am for the multiplexer 22 or 24 of the demodulating switching circuit 6 according to FIG. 2.

Figure 6:
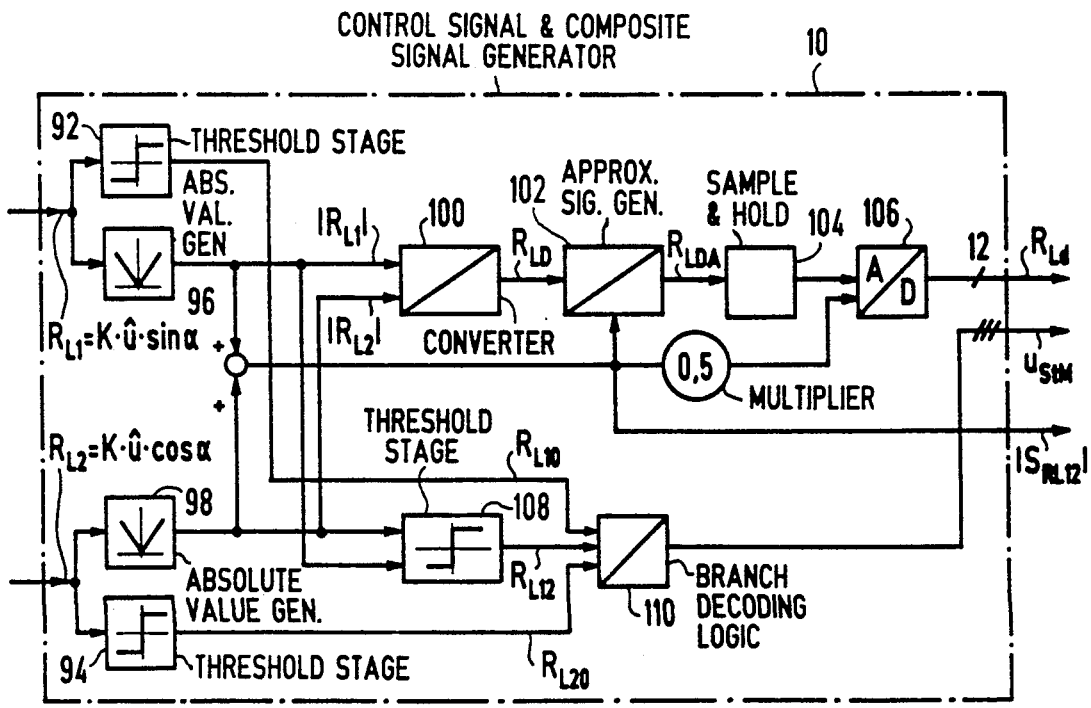
FIG. 6 shows a circuit for generating a rotor-position signal or an angle-of-rotation signal.
Figure 16:
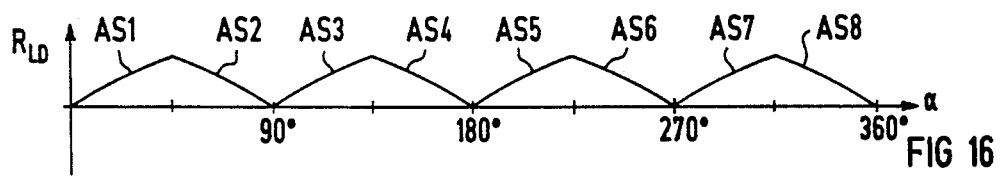
FIGS. 16 to 21 illustrate the signal patterns of the circuit for generating a rotor-position signal or an angle-of-rotation signal of FIG. 6, whereby the signals are depicted as a function of the angle of rotation.
Figure 17:
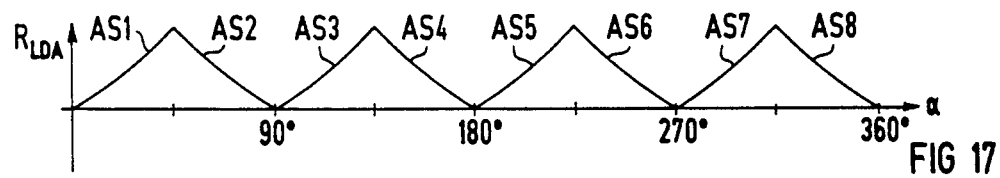

FIG. 6 depicts a rotor-position signal or an angle-of-rotation signal $R_{Ld}$ generator 10. This circuit 10, which is described in more detail in the European Patent Application with reference number 89105645.9 (GR 89 P 3145 E), features a threshold stage 92 or 94 and an absolute-value generator 96 or 98 on the incoming side for each resolver output signal $S_1$ or $S_2$. The outputs of the absolute-value generator 96 and 98 are added to form a composite signal $|S_{RL12}|$ and are also fed to a converter 100, which outputs the smaller of the two amounts of the amplitude signals $|R_{L1}|$ and $|R_{L2}|$ as a signal $R_{LD}$. This signal $R_{LD}$ is depicted as a function of the angle of rotation $\alpha$ in FIG. 16. The individual branches AS1 to AS8 of this signal $R_{LD}$ show respectively a decreasingly or increasingly variable slope. By means of a characteristic-approximating generator 102, to which is supplied the composite signal $|S_{RL12}|$ as a reference voltage, an approximated signal $R_{LDA}$ is generated, which is depicted in greater detail as a function of the angle of rotation $\alpha$ in FIG. 17. The individual branches AS1 to AS8 of this approximated signal $R_{LDA}$ show respectively decreasingly or increasingly variable slopes. Such a characteristic-approximating generator 102 is known, for example, from "Messlektronik" [*Measuring Electronics*] by Horst Germer and Norbert Wefers, vol. 1, 1985, pp 186 to 192. The pertinent portion of this reference is recited below as an aid to the reader.

Approximation of Linear Characteristics

Almost any characteristic curves can be realized, when the resistors of an amplifier circuit, which resistors determine amplification, are switched over at certain values of the input or of the output voltage. A characteristic curve is then obtained, which runs linearly, in segments, between two switching points, and which can be made to approximate a specified non-linear curve.

Figure 27:
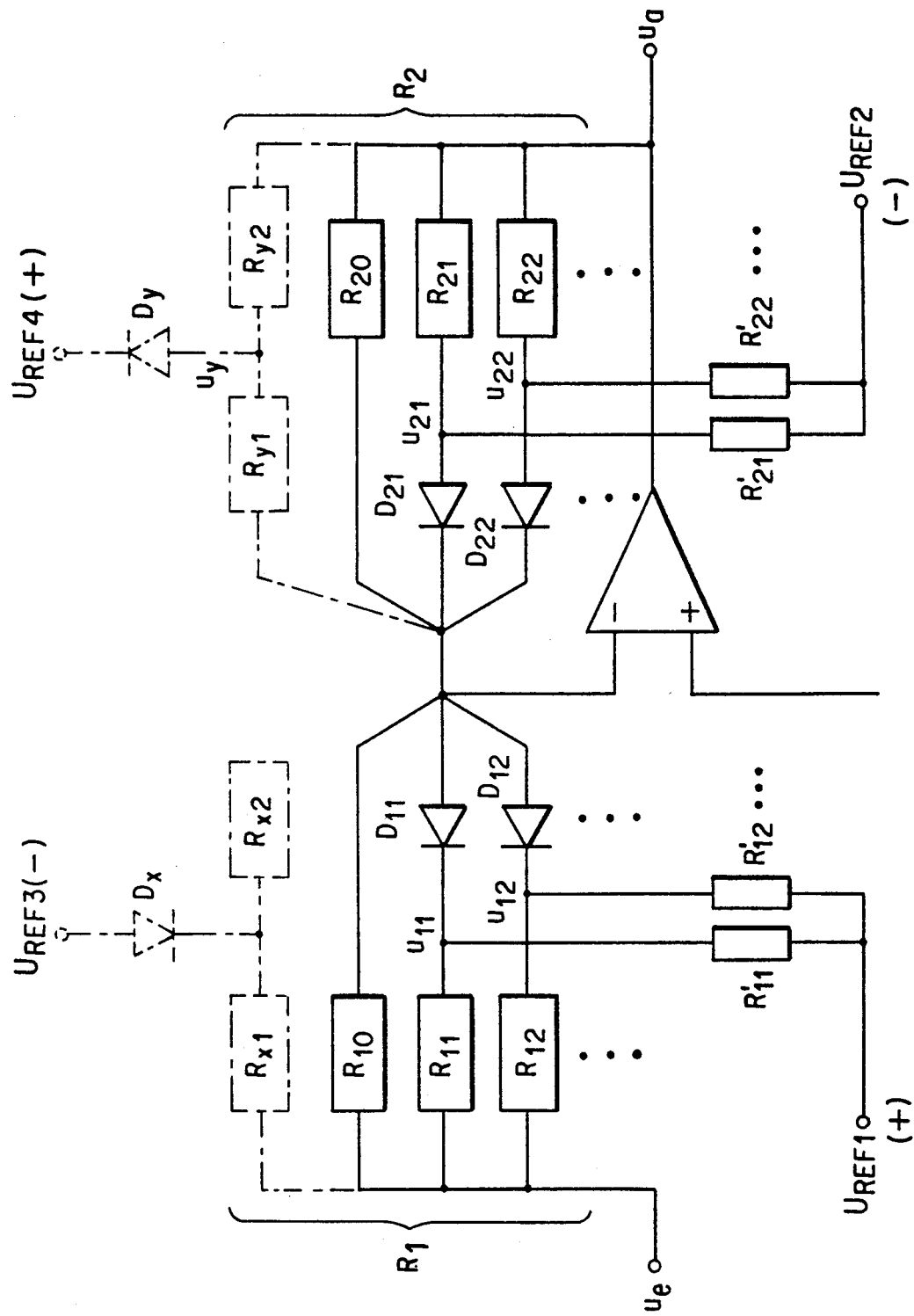
FIG. 27 depicts an example of a nonlinear amplifier having a diode network for a piece-by-piece, linear characteristic-curve approximation.

FIG. 27, shows an example of such a non-linear amplifier. It is based on the basic inverting circuit and contains a diode network for switching over two amplifying resistors $R_1$ and $R_2$, in accordance with the input and output voltages. While explaining the functioning of this circuit, we shall assume ideal diode performance characteristics.

The circuit contains four resistor pairs $R_{11}$-$R'_{11}$, $R_{12}$-$R'_{12}$, $R_{21}$-$R'_{21}$, and $R_{22}$-$R'_{22}$, which form voltage dividers between the input voltage $u_c$ and a positive reference voltage $U_{ref1}$, or rather, between the output voltage $u_a$ and a negative reference voltage $U_{ref2}$, for $u_c = 0$ and $u_a = 0$, the partial voltages $u_{11}$ and $u_{12}$ are positive, and the partial voltages $u_{21}$ and $u_{22}$ are negative. Thus, all diodes are initially blocked, and only the resistors $R_1 = R_{10}$ and $R_2 = R_{20}$ are effective for the amplification. Thus, in accordance with known equations, the amplification around the zero point is $v'_{OA} = -R_{20}/R_{10}$.

Figure 28:
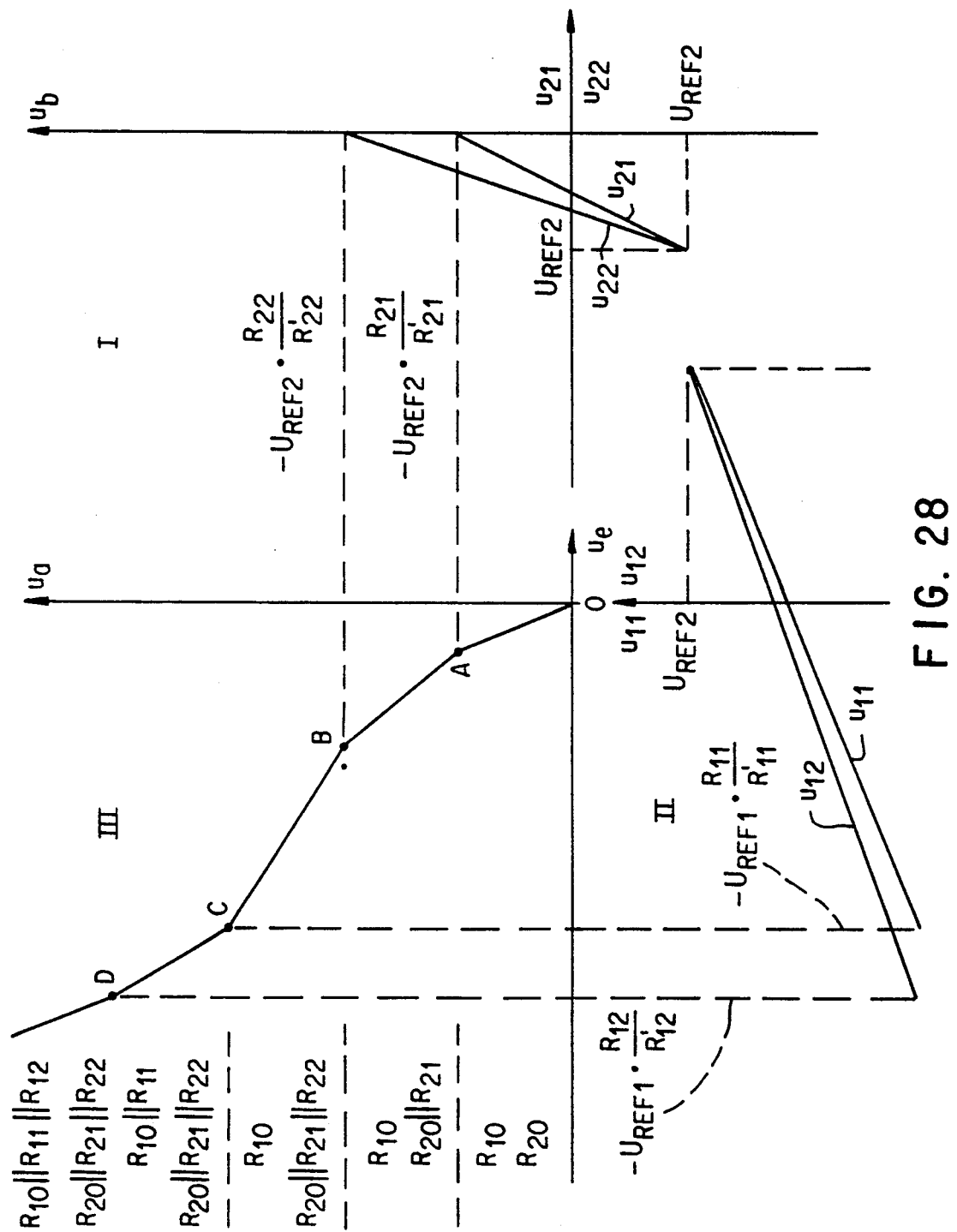
FIG. 28 depicts voltage diagrams for the nonlinear amplifier circuit according to FIG. 27, in which Area I shows partial voltages $u_{21}$ and $u_{22}$ as functions of the output voltage $u_o$; Area II shows partial voltages $u_{11}$ and $u_{12}$ as functions of the input voltage $u_c$; Area II depicts the characteristic curve of the nonlinear amplifier $u_a = f(u_e)$.

Referring to FIG. 28, Diagrams I and II show that as output voltage $u_a$ increases, the partial voltages $u_{21}$ and $u_{22}$ rise linearly, and the partial voltages $u_{11}$ and $u_{12}$ decrease linearly with declining input voltage $u_e$. Ascents in the linear segments are determined thereby by the corresponding conditions of the potential divider. It is assumed that the partial voltage $u_{21}$ in the negative feedback branch first becomes zero. This happens when the output voltage $u_a$ reaches the value $-U_{ref2} - R_{21} - R'_{21}$. The diode $D_{21}$ now becomes conductive, $u_{21}$ is kept to 0 V in case of an output voltage that continues to rise, and the parallel circuit of $R_{20}$ and $R_{21}$ now becomes effective as a negative-feedback resistor. This means that the amplification is reduced (break point A in diagram III). It is reduced a second time when the partial voltage $u_{22}$ reaches the 0 V limit and the resistor $R_{22}$ is connected in parallel (break point B). The branch in the negative-feedback network drawn with a dotted line shows that it is also possible to have an increase in resistance by switching off a partial resistor; as soon as the partial voltage $u_y$ attains the value of the positive reference voltage $U_{ref4}$, the diode $D_y$ becomes conductive, and $R_{y1}$ and $R_{y2}$ become ineffective as negative-feedback resistors.

As soon as the voltage $u_{11}$ reaches the 0 V limit in the input branch, $D_{11}$ becomes conductive and $R_{11}$ is connected parallel to $R_{10}$. As a result, $R_{11}$ is reduced, and the amplification rises (break point C). Finally, $u_{12}$ also reaches the 0 V limit, $R_{12}$ is connected in addition, and the amplification increases one more time (break point D). In the input circuit as well, it is possible for there to be a reverse influencing of the total resistance $R_1$ and, thus, an opposite dip in the characteristic curve, as indicated again by a dotted line.

What is interesting about this method is that the profile of the characteristic curve does not depend in a first approximation upon the diode characteristics, but rather only upon the resistors, since they determine both the position of the break points as well as the partial ascents. It is even desirable for the diode characteristic profile, i.e., the gradual transition from the transmitting into the blocking zone, not to be ideal, because this rounds off the breaks in the characteristic curve somewhat. However, it is pointless to arbitrarily increase the number of diode branches. An optimum dimensional design including five or six branches results in faults in the order of magnitude of a few percent. It is hardly possible to cut back on this further.

As far as the practical dimensional design is concerned, the best way to proceed is to assume ideal diodes for determining the resistances and to establish the final characteristic curve through an empirical adjustment of the finished circuit, for example, by slightly varying the two reference voltages.

With diode networks, for example, quadratic characteristic curves can be realized relatively simply for measuring effective values or power. If the second parabolic branch is also needed, then a full-wave rectifier can be connected to the squaring amplifier in the incoming circuit. An important application is also the linearization of the characteristic-curve, as explained in the following.

Linearization

Figure 29:
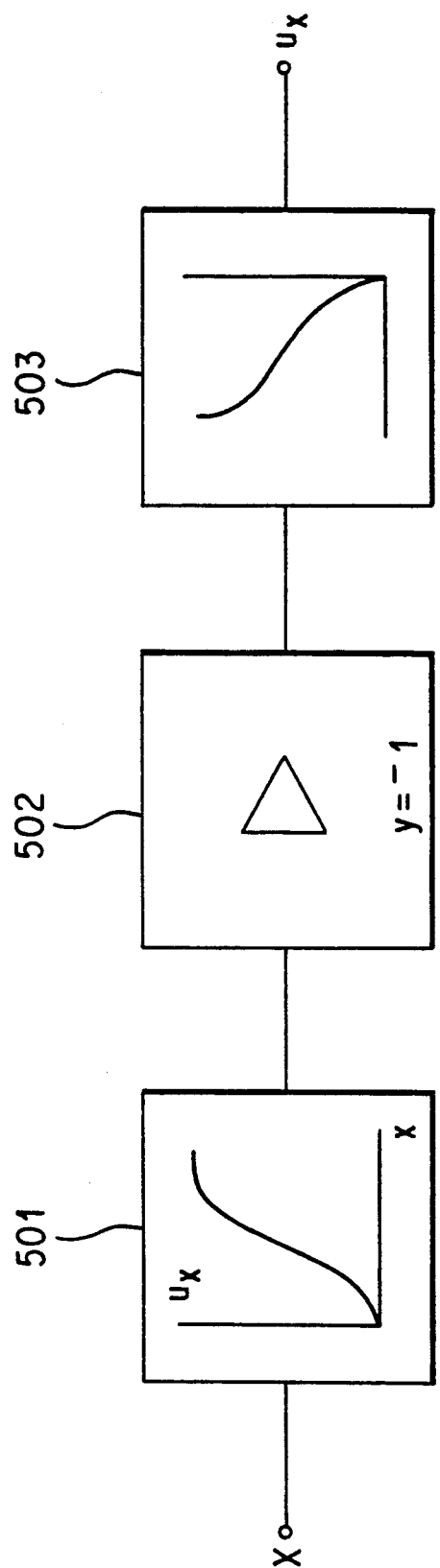
FIG. 29 depicts a non-linear sensor having a downstream non-linear amplifier for the linearization of the characteristic curve.

Often in metrology, specified non-linear characteristics need to be linearized. This task can be solved, for example, by inserting a non-linear measuring element in the path of the signal flow. Its characteristic corresponds to the inverse function of the characteristic to be linearized. This method is especially simple, when the element which effects the non-linearlity is available for a second time to develop the inverse function. Then, in addition to instances of non-linearity, one can also compensate, at least in a first approximation, for dependencies upon disturbance variables. The inverse function can also be synthesized by means of a linear characteristic approximation, as depicted in FIG. 29.

Figure 30:
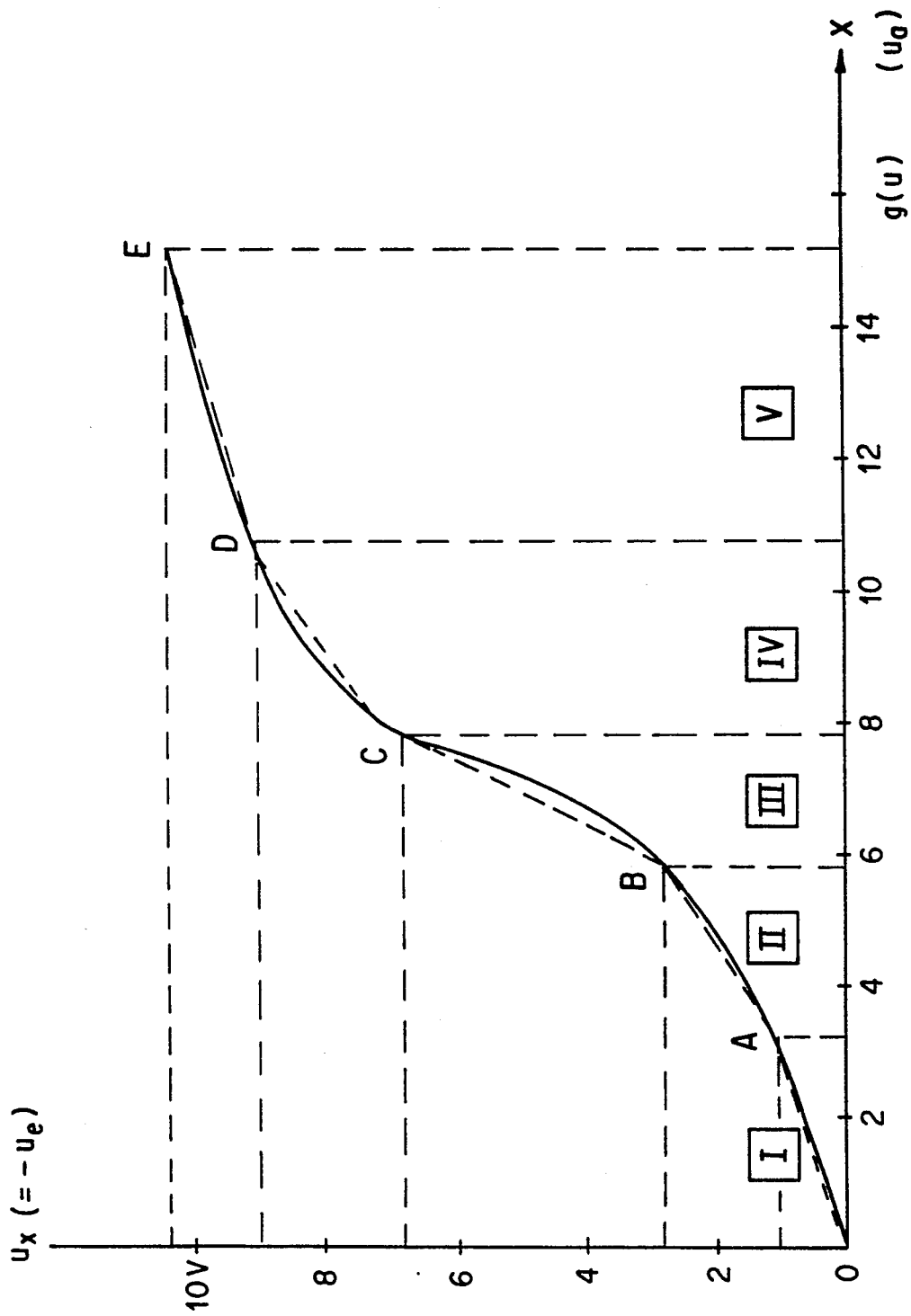
FIG. 30 depicts the sensor characteristic to be linearized.

One assumes that a sensor 501 converts a mechanical measuring signal x non-linearly into a voltage signal $u_x$, and that the non-linear (depicted in FIG. 27 without the branches indicated by dotted lines) is supposed to be dimensioned so as to allow the output voltage $u_a$ to be proportional to the measured variable x. The inverting amplifier 502 has the task of canceling the sign reversal of the non-linear amplifier, and it can be dispensed with in some instances. FIG. 30 illustrates quantitatively the assumed sensor has the characteristic $u_x = f(x)$, whose inverse function is to be realized by the non-linear amplifier. At the same time, FIG. 30 depicts the required characteristic curve $u_a = g(-u_a)$ of the non-linear amplifier.

To dimensionally design the circuit, the characteristic curve is first approximated by means of linear segments between suitably selected interpolation points, O, A, B, C, D and E. The coordinates of these interpolation points are entered in Table I.

TABLE I

| End Point | $-\dfrac{u_e}{V}$ | $\dfrac{u_a}{V}$ | Area | $-V' = \dfrac{R_2}{R_1}$ | $R_1$ | $R_2$ |
|---|---|---|---|---|---|---|
| 0 | 0 | 0 | | | | |
| | | | I | 4.11 | $R_{10} = 10.0\ k\Omega$ | $R_{20} = 41.1\ k\Omega$ |
| A | 0.82 | 3.37 | | | | |
| | | | II | 1.33 | $R_{10} = 10.0\ k\Omega$ | $R_{20} \| R_{21} = 13.3\ k\Omega \rightarrow R_{21} = 19.7\ k\Omega$ |
| B | 2.72 | 5.90 | | | | |
| | | | III | 0.47 | $R_{10} = 10.0\ k\Omega$ | $R_{20} \| R_{21} \| R_{22} = 4.7\ k\Omega \rightarrow R_{22} = 7.27\ k\Omega$ |
| C | 6.75 | 7.80 | | | | |
| | | | IV | 1.25 | $R_{10} \| R_{11} = 3.76\ k\Omega \rightarrow R_{11} = 6.03\ k\Omega$ | $R_{20} \| R_{21} \| R_{22} = 4.7\ k\Omega$ |
| D | 8.96 | 10.56 | | | | |
| | | | V | 3.74 | $R_{10} \| R_{11} \| R_{12} = 1.257\ k\Omega \rightarrow R_{12} = 1.89\ k\Omega$ | $R_{20} \| R_{21} \| R_{22} = 4.7\ k\Omega$ |
| E | 10.13 | 14.94 | | | | |

$$\dfrac{u_{aA}}{R_{21}} = \dfrac{-U_{ref2}}{R_{21}'} \rightarrow R_{21}' = R_{21} \cdot \dfrac{-U_{ref2}}{u_{aA}} = 19.7\ k\Omega \cdot \dfrac{10V}{3.37V} = 58.5\ k\Omega$$

$$\dfrac{u_{aB}}{R_{22}} = \dfrac{-U_{ref2}}{R_{22}'} \rightarrow R_{22}' = R_{22} \cdot \dfrac{-U_{ref2}}{u_{aB}} = 7.27\ k\Omega \cdot \dfrac{10V}{5.90V} = 12.32\ k\Omega$$

TABLE I-continued $$\frac{-u_{eC}}{R_{11}} = \frac{U_{ref1}}{R_{11}'} \rightarrow R_{11}' = R_{11} \cdot \frac{U_{ref1}}{-u_{eC}} = 6.03 \text{ k}\Omega \cdot \frac{10\text{V}}{6.75\text{V}} = 8.93 \text{ k}\Omega \qquad \frac{-u_{eD}}{R_{12}}$$

They are used to calculate the rises in the partial intervals I through V between the interpolation points, which are identical to the prevailing amplifications, thus to the resistance conditions $R_2/R_1$. If $R_{10}$ is fixed at 10.0kΩ, then the required resistance $R_{20}$ results in interval I. At point A, the resistance $R_{21}$, which is calculated with the aid of the required amplification in interval II, is additionally connected. In the same manner, the resistances $R_{22}$, $R_{11}$ and $R_{12}$ can be determined one after another from the amplifications in the intervals III, IV and V. $U_{ref1} = -U_{ref2} = 10\text{V}$ is selected for the two reference voltages, which can be fixed arbitrarily. The resistances $R'_{21}$, $R'_{22}$, $R'_{11}$, $R'_{12}$ can be determined from the desired coordinates of the break points A through D, in accordance with the following consideration: At the break point A, the diode $D_{21}$ becomes conductive. The currents in $R_{21}$ and $R'_{21}$ are then the same, and the $u_{21}$ is zero. Thus, it applies that $u_{aA}R_{21} = -U_{ref2}/R'_{21}$; from this $R'_{21}$ is computed.

The linearity errors of the thus dimensioned circuit can only be determined empirically. They are considerably smaller than FIG. 30 would lead one to expect, since ideal diodes are presupposed there. Given a careful dimensional design, the errors are not greater than a few percent from the upper range value.

An alternative possibility for linearizing a characteristic curve is the application of microcomputer technology.

Another analogous linearization method is the often applied differential principle. It presupposes two similar elements having inverse or complementary characteristic curves, which are triggered by a shared input signal, and whose output signals are subtracted, or rather added. Examples of elements having corresponding characteristic curves are, for instance, differential sensors or CMOS transistor pairs. The characteristic curves can be represented by power or exponential series:

$$x_{a1} = f(x_e) = a_0 + a_1 x_e - a_2 x_e^2 + a_3 x_e^3 - \ldots$$

$$x_{B2} = \pm f(-x_e) = \pm(a_0 - a_1 x_e + a_2 x_e^2 - \ldots)$$

The linearized output signal is obtained by means of subtraction or addition:

$$X_a = X_{a1} \mp x_{B2} = 2a_1 x_e + 2a_3 x_e^3 + \ldots,$$

which in a first approximation is proportional to the input signal. Constant zero components disappear (for example zero point errors), and the non-linearities compensate each other in a first approximation.

Figure 21:
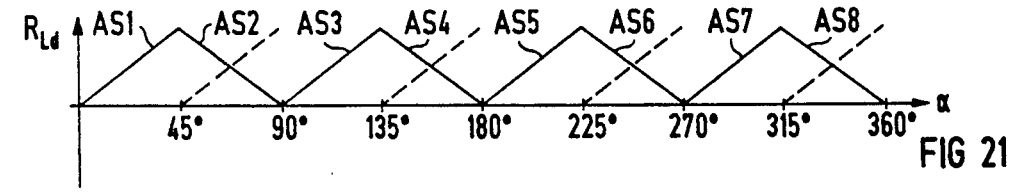

Conversely, if one adds the partial signals, or rather subtracts them, then one obtains a signal $$x_a = x_{a1} \pm x_{B2} = 2a_0 + 2a_2 x_e^2 + \ldots,$$

which in a first approximation, and given a small modulation amplitude, is independent of the input variable. One cannot make use of this when the aim is to eliminate an undersirable influence, such as a temperature influence. The approximated signal $R_{LDA}$ is digitized by means of a sample-and-hold element 104 and an analog-to-digital converter 106. The analog-to-digital converter 106 receives as a reference signal half of the composite signal $|S_{RL12}|$. the digital output signal $R_{LD}$ is depicted as a function of the angle of rotation $\alpha$ in FIG. 21, whereby the individual branches AS1 to AS8 are linear. Conditional on the reference voltage $|S_{RL12}|$ for the characteristic-approximating generator 102 and the reference signal $\frac{1}{2} |S_{RL12}|$ for the analog-digital converter 106, an approximated signal $R_{LDA}$ must be formed from the signal $R_{LD}$, so that the digital signal $R_{LD}$ can arise at the output of the circuit 10.

The outputs of the absolute value generators 96 and 98 are likewise supplied to a further threshold Additional details regarding the present invention are as follows. The stage 108, which then always generates a corresponding output signal $R_{L12}$, when $$|R_{L2}| < |R_{L1}|$$

Figure 18:
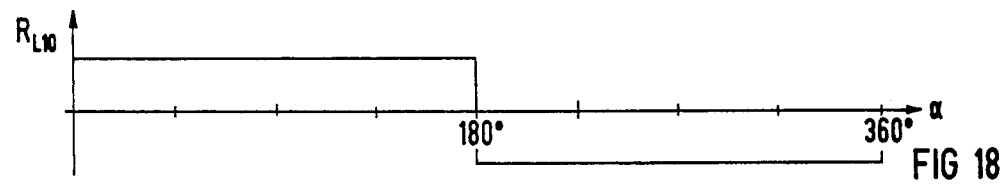
Figure 19:
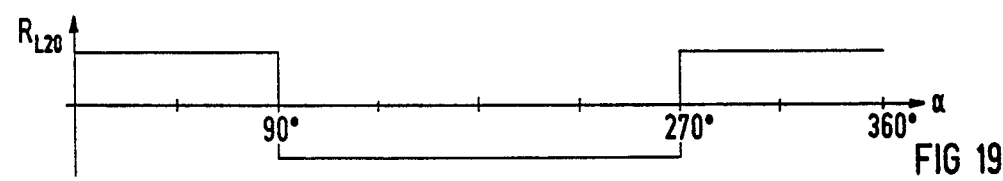
Figure 20:
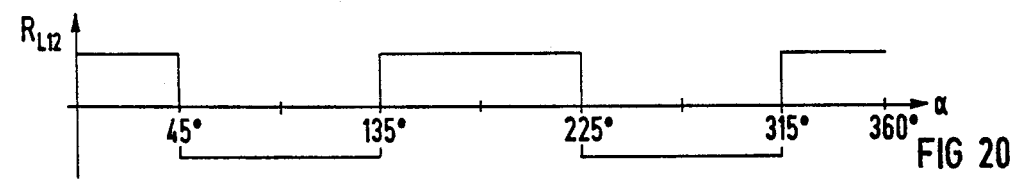

This output signal $R_{L12}$ is depicted as a function of the angle of rotation $\alpha$ in FIG. 20. The output signals $R_{L10}$ and $R_{L20}$ are likewise depicted respectively as a function of the angle of rotation $\alpha$ in FIGS. 18 and 19. These output signals $R_{L10}$, $R_{L20}$ and $R_{L12}$ are fed to a branch decoding logic 110, which represents these output signals by means of three bits, which output as control signals $u_{SIM}$ from the branch decoding logic 110. By means of these control signals $u_{SIM}$ and a processing circuit (not shown), the branches AS1 to AS8 of the rotor-position signal or the angle-of-rotation signal $R_{Ld}$ can be combined to form a linearly rising segment representing a rotor-position- or an angle-of-rotation-proportional voltage $u_a$.

Figure 7:
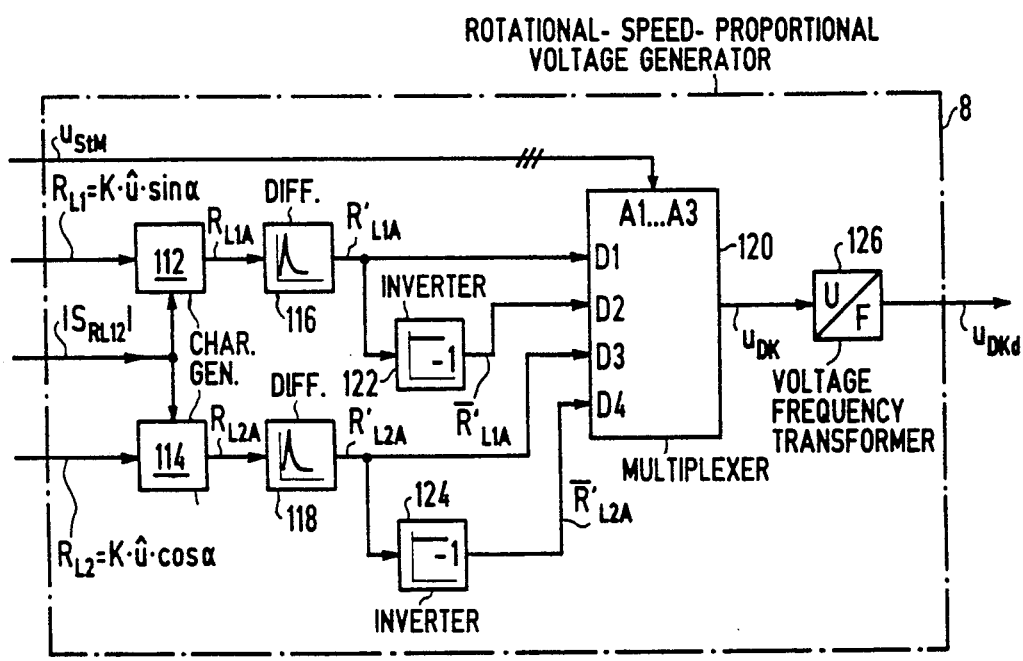
FIG. 7 illustrates a circuit for generating a rotational-speed-proportional voltage.
Figure 22:
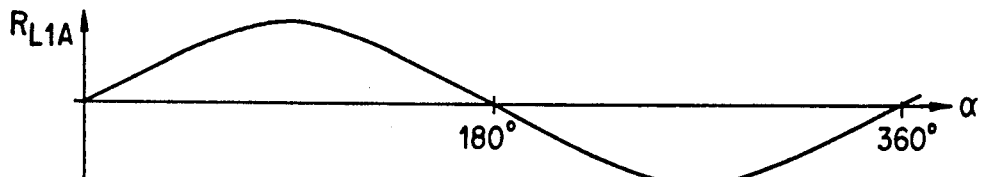
FIGS. 22 to 26 depict the signal patterns of the apparatus for generating a rotational-speed-proportional voltage of FIG. 7, whereby the signals are shown as a function of the angle of rotation.
Figure 23:
Figure 24:
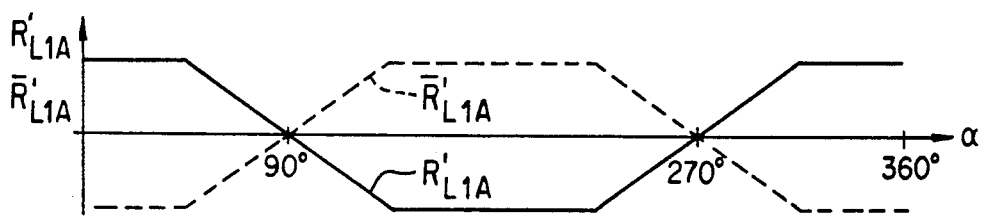
Figure 25:
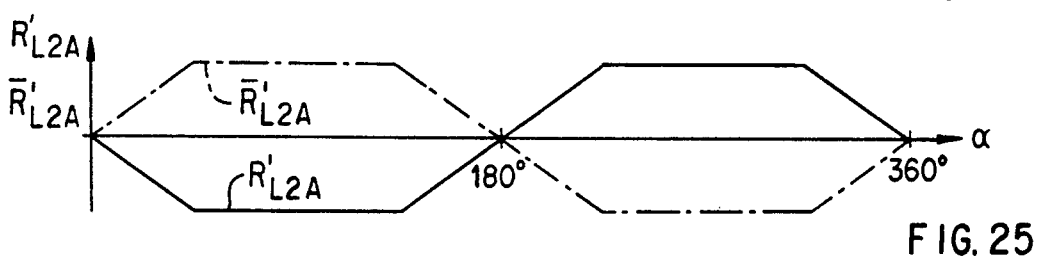
Figure 26:
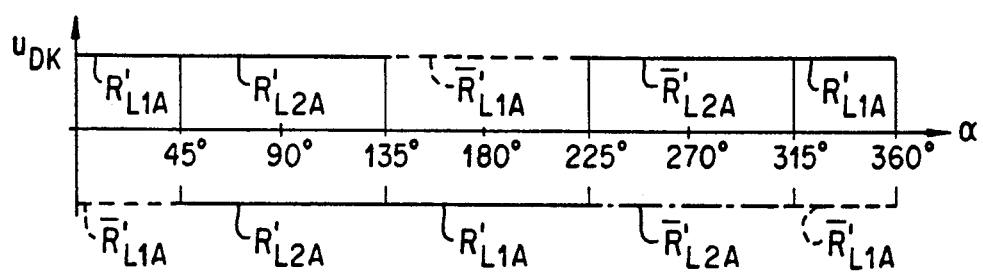

In FIG. 7, a rotational-speed-proportional voltage uDKd generator 8 for is depicted. This circuit 8 features on the incoming side for each sinusoidal amplitude signal $R_{L1}$ or $R_{L2}$ a characteristic generator 112 or 114, which is followed by a differentiator 116 or 118. The characteristic generator 112 or 114 converts the incoming side, sinusoidal amplitude signal $R_{L1}$ or $R_{L2}$ into an approximated, sinusoidal amplitude signal $R_{L1A}$ or $R_{L2A}$ which is linear around the zero crossing in a range of ±45°. This approximated amplitude signal $R_{L1A}$ or $R_{L2A}$ is plotted as a function of the angle of rotation $\alpha$ in FIG. 22 or 23. Such a characteristic generator 112 or 114 is known, for example, from "Messelektronik" [*Measuring Electronics*] by Horst Germer and Norbert Wefers, vol. 1, 1985, pp 186 to 192. This generated, approximated amplitude signal $R_{L1A}$ or $R_{L2A}$ is subsequently differentiated. The differentiated signal $R'_{L1A}$ or $R'_{L2A}$ is depicted as a function of the angle of rotation $\alpha$ in FIG. 24 or 25. These differentiated signals $R'_{L1A}$ or $R'_{L2A}$ are fed directly to a multiplexer 120 and via an inverter 122 and 124. The inverted, differentiated signals and $\overline{R}'_{L1A}$ and $\overline{R}'_{L2A}$ are likewise in the diagram of FIG. 24 or 25. In addition, the control signals $u_{SIM}$ of the branch decoding logic 110 of the circuit 10 according to FIG. 6 are fed to the address inputs. Depending upon these control signals $u_{SIM}$, the signals applied to the data inputs are switched through in such a way that a rotational-speed-proportional voltage $u_{DK}$ is the output of the multiplexer 120. This rotational-speed-proportional voltage $u_{DK}$ is depicted as a function of the angle of rotation $\alpha$ in FIG. 26.

If a digital, automatic speed control is planned for a feed drive or a main spindle drive, then this rotational-speed-proportional voltage $u_{DK}$ can be digitized by means of a voltage-frequency transformer 126 or an analog-to-digital converter.

Since this circuit 8 is provided to detect the smallest rotational-speeds, the rotational-speed range can be adjusted by dimensioning the differentiator, in that it is useful to evaluate the amplitude signals $R_{L1}$ and $R_{L2}$ with this circuit 8. The rotational-speeds which lie outside of the rotational-speed range of the circuit configuration 8 are detected by means of the circuit configuration 10 and as a function of the difference between two rotor positions relative to a sampling time. To ensure the continual detection of the rotational-speed, the two acquisitions of rotational-speed show an overlap range.

What is claimed is:

1. A method for generating a rotational-speed-proportional voltage using a resolver that has a first and second output, wherein a sign of the rotational-speed-proportional voltage corresponds to a direction of rotation of the resolver, said method comprising the steps of:
   a) modulating an amplitude of a first sinusoidal voltage and an amplitude of a second sinusoidal voltage as a function of a rotor position, thus creating a first path-dependent amplitude-modulated (AM) sinusoidal voltage and a second path-dependent AM sinusoidal voltage, wherein said first and second path-dependent AM sinusoidal voltages are in phase quadrature;
   b) tapping said first path-dependent AM sinusoidal voltage at the first resolver output;
   c) tapping said second path-dependent AM sinusoidal voltage at the second resolver output;
   d) extracting a first sinusoidal amplitude signal which is dependent upon the rotor position, from said first path-dependent AM sinusoidal voltage;
   e) extracting a second sinusoidal amplitude signal which is dependent upon the rotor position, from said second path-dependent AM sinusoidal voltage in the demodulating circuit;
   f) converting said first sinusoidal amplitude signal into a first approximated sinusoidal signal which is linear around a zero crossing in a range of ±45°, by means of a plurality of characteristic generators;
   g) converting said second sinusoidal amplitude signal into a second approximated sinusoidal signal which is linear around a zero crossing in a range of ±45°, by means of a plurality of characteristic generators;
   h) differentiating said first approximated sinusoidal signal to form a first differentiated signal;
   i) differentiating said second approximated sinusoidal signal to form a second differentiated signal;
   j) differentiating and inverting said first approximated sinusoidal signal to form a first inverted differentiated signal;
   k) differentiating and inverting said second approximated sinusoidal signal to form a second inverted differentiated signal;
   l) forming the rotational-speed-proportional voltage, which is dependent upon a detected rotor position, from said first and second differentiated signals and from said first and second inverted differentiated signals in a multiplexing device;
   m) generating a plurality of control signals in a branch decoding logic, wherein said control signals provide information on an angular range in which a rotor is situated; and
   n) feeding said plurality of control signals to the multiplexing device, which outputs the rotational-speed-proportional voltage.

2. A method for generating a rotational-speed-proportional voltage using a resolver, having a first and second output, wherein a sign of the rotational-speed-proportional voltage corresponds to a direction of rotation of the resolver, said method comprising the steps of:
   a) modulating an amplitude of a first sinusoidal voltage and an amplitude of a second sinusoidal voltage as a function of an angle of rotation, thus creating a first angle-dependent amplitude-modulated (AM) sinusoidal voltage and a second angle-dependent AM sinusoidal voltage, wherein said first and second angle-dependent AM sinusoidal voltages are in phase quadrature;
   b) tapping said first angle-dependent AM sinusoidal voltage at the first resolver output;
   c) tapping said second angle-dependent AM sinusoidal voltage at the second resolver output;
   d) extracting a first sinusoidal amplitude signal which is dependent upon the angle of rotation from said first angle-dependent AM sinusoidal voltages in a demodulating circuit;
   e) extracting a second sinusoidal amplitude signal which is dependent upon the angle of rotation from said second angle-dependent AM sinusoidal voltages in the demodulating circuit;
   f) converting said first sinusoidal amplitude signal into a first approximated sinusoidal signal which is linear around a zero crossing in a range of ±45°, by means of a plurality of characteristic generators;
   g) converting said second sinusoidal amplitude signal into a second approximated sinusoidal signal which is linear around a zero crossing in a range of ±45°, by means of a plurality of characteristic generators;
   h) differentiating said first approximated sinusoidal signal to form a first differentiated signal;
   i) differentiating said second approximated sinusoidal signal to form a second differentiated signal;
   j) differentiating and inverting said first approximated sinusoidal signal to form a first inverted differentiated signal;
   k) differentiating and inverting said second approximated sinusoidal signal to form a second inverted differentiated signal;
   l) forming the rotational-speed-proportional voltage, which is dependent upon a detected angle of rotation, from said first and second differentiated signals and from said first and second inverted differentiated signals in a multiplexing device;
   m) generating a plurality of control signals in a branch decoding logic, wherein said control signals provide information on an angular range in which a rotor is situated; and
   n) feeding said plurality of control signals to the multiplexing device, which outputs the rotational-speed-proportional voltage.

3. The method according to claim 1, wherein the steps of extracting the first and second sinusoidal amplitude signals further comprise:
   a) generating a first integrated AM sinusoidal voltage from said first path-dependent AM sinusoidal voltage; and b) generating a second integrated AM sinusoidal voltage from said second path-dependent AM sinusoidal voltage; and c) developing a first plurality of phase-displaced sinusoidal voltages from said first AM sinusoidal voltages and from said first integrated AM sinusoidal voltage;

d) developing a second plurality of phase-displaced sinusoidal voltages from said second AM sinusoidal voltages and from said second integrated AM sinusoidal voltage;

e) filtering out said first amplitude signal from said first plurality of phase-displaced sinusoidal voltages; and f) filtering out said second amplitude signal from said second plurality of phase-displaced sinusoidal voltages.

4. The method according to claim 1, wherein the steps of extracting the first and second sinusoidal amplitude signals further comprise:

a) generating a first integrated AM sinusoidal voltage from said first-path-dependent AM sinusoidal voltage;

b) generating a second integrated AM sinusoidal voltage from said second-path-dependent AM sinusoidal voltage;

c) squaring said first path-dependent AM sinusoidal voltage to form a first squared AM sinusoidal voltage;

d) squaring said second path-dependent AM sinusoidal voltage to form a second squared AM sinusoidal voltage;

e) squaring said first integrated AM sinusoidal voltage to form a first squared integrated AM sinusoidal voltage;

f) squaring said second integrated AM sinusoidal voltage to form a second squared integrated AM sinusoidal voltage;

g) adding said first squared AM sinusoidal voltage and said first squared integrated AM sinusoidal voltage to form a first composite signal;

h) adding said second squared AM sinusoidal voltage and said second squared integrated AM sinusoidal voltage to form a second composite signal;

i) generating said first amplitude signal through root extraction of said first composite signal; and j) generating said second amplitude signal through root extraction of said second composite signal.

5. The method according to claim 1, wherein the steps of extracting the first and second sinusoidal amplitude signals further comprise:

a) generating a first integrated AM sinusoidal voltage from said first path-dependent AM sinusoidal voltage;

b) generating a second integrated AM sinusoidal voltage from said second path-dependent AM sinusoidal voltage;

c) rectifying said first path-dependent AM sinusoidal voltage to form a first rectified AM sinusoidal voltage;

d) rectifying said second path-dependent AM sinusoidal voltage to form a second rectified AM sinusoidal voltage;

e) rectifying said fist integrated AM sinusoidal voltage to form a first rectified integrated AM sinusoidal voltage;

f) rectifying said first integrated AM sinusoidal voltage to form a first rectified integrated AM sinusoidal voltage;

g) rectifying said second integrated AM sinusoidal voltage to form a second rectified integrated AM sinusoidal voltage;

h) feeding said first and second rectified AM sinusoidal voltages and feeding said first and second rectified integrated AM sinusoidal voltages to a vector analyzer;

i) generating a first rectified amplitude signal from said first rectified AM sinusoidal voltage and from said first rectified integrated AM sinusoidal voltage;

j) generating a second rectified amplitude signal from said second rectified AM sinusoidal voltage and from said second rectified integrated AM sinusoidal voltage;

k) converting said first rectified amplitude signal into said first amplitude signal; and l) converting said second rectified amplitude signal into said second amplitude signal.

6. An apparatus for generating a rotational-speed-proportional voltage comprising:

a) a resolver having a rotor side input and a direction of rotation, and having a first amplitude-modulated (AM) sinusoidal voltage as a first output and having a second amplitude-modulated (AM) sinusoidal voltage as a second output, whereby a sign of the rotation-speed-proportional voltage corresponds to the direction of rotation;

b) a function generator generating a cosinusoidal inductor excitation voltage and having a first output and a second output, wherein the first output is coupled to the rotor side input;

c) a demodulating switching circuit having as inputs the first and second path-dependent AM sinusoidal voltages extracting a first sinusoidal amplitude signal from the first path-dependent AM sinusoidal signal and extracting a second sinusoidal amplitude signal from the second path-dependent AM sinusoidal signal, and having as first and second outputs the first and second sinusoidal amplitude signals;

d) a rotational-speed-proportional voltage generator receiving as inputs the first and second sinusoidal amplitude signals and including:

(1) a first characteristic generator receiving as an input the first sinusoidal amplitude signal and having as an output a first approximated sinusoidal signal;

(2) a second characteristic generator receiving as an input the second sinusoidal amplitude signal and having as an output a second approximated sinusoidal signal;

(3) a first differentiator having an input coupled to the output of said first characteristic generator, differentiating said first approximated sinusoidal amplitude signal to form a first differentiated signal, and having as an output the first differentiated signal;

(4) a second differentiator having an input coupled to said second characteristic generator, differentiating said second approximated sinusoidal amplitude signal to form a second differentiated signal, and having as an output the second differentiated signal;

(5) a first inverter having an input coupled to the output of the first differentiator, inverting the first differentiated signal, and having as an output a first inverted differentiated signal;

(6) a second inverter having an input coupled to the second differentiator, inverting the second differentiated signal, and having as an output a first inverted differentiated signal;

e) a multiplexer having a plurality of address inputs, having a first input coupled to the output of the first inverter, having a second input coupled to the output of the second inverter, having a third input coupled to the output of the first differentiator, having a fourth input coupled to the output of the second differentiator, and having as an output the rotational-speed-proportional voltage;

f) voltage-to-frequency transformer having an input coupled to the output of the multiplexer; and g) a rotor-position signal generator generating a rotor position signal including:
  (1) a first input being coupled to the first output of the demodulating switching circuit;
  (2) a second input being coupled to the second output of the demodulating switching circuit;
  (3) a first output outputting a rotor position signal;
  (4) a second output being coupled to the rotational-speed proportional voltage generator;
  (5) a branch decoding logic generating a plurality of control signals which depend on a rotor position and indicate in which angular range a rotor is situated and which are coupled to the plurality of address inputs of said multiplexer; and h) a computing circuit receiving as a first input the first output of the rotor-position signal generator and having as a second input the plurality of control signals from the rotor-position signal generator.

7. The circuit configuration according to claim 6, wherein said demodulating switching circuit further comprises:
  (a) a first integrator having as an input the first output of the resolver, integrating the first path-dependent AM sinusoidal voltage and having as an output a first integrated AM sinusoidal voltage;
  (b) a second integrator having as an input the second output of the resolver, integrating the second path-dependent AM sinusoidal voltage and having as an output a second integrated AM sinusoidal voltage;
  (c) a first phase shifter having as a first input the first output of the resolver, having as a second input the output of the first integrator, and having as a plurality of outputs a first plurality of n phase-displaced sinusoidal voltages;
  (d) a second phase shifter having as a first input the second output of the resolver, having as a second input the output of the second integrator, and having as a plurality of outputs a second plurality of n phase-displaced sinusoidal voltages;
  (e) a first multiplexer having as a plurality of inputs the plurality of outputs of the first phase shifter, and having an output;
  (f) a second multiplexer having as a plurality of inputs the plurality of outputs of the second phase shifter, and having an output;
  (g) a first filter having as an input the output of the first multiplexer and outputting the first sinusoidal amplitude signal; and
  (h) a second filter having as an input the output of the second multiplexer, and outputting the second sinusoidal amplitude signal.

8. The circuit configuration according to claim 6, wherein said demodulating switching circuit further comprises:
  (a) a first integrator having as an input the first output of the resolver, integrating the first AM sinusoidal voltage, and having as an output a first integrated AM sinusoidal voltage;
  (b) a second integrator having as an input the second output of the resolver, integrating the second AM sinusoidal voltage, and having as an output a second integrated AM sinusoidal voltage;
  (c) a first multiplier having as a first and second input the first output of the resolver, and having an output;
  (d) a second multiplier having as a first and second input the second output of the first integrator, and having an output;
  (e) a third multiplier having as a first and second input the second output of the resolver, and having an output;
  (f) a fourth multiplier having as a first and second input the output of the second integrator, and having an output;
  (g) a first adder having as a first input the output of said first multiplier, having as a second input the output of said second multiplier, and having an output;
  (h) a second adder having as a first input the output of said third multiplier, having as a second input the output of said fourth multiplier, and having an output;
  (i) a first root extractor having as an input the output of the first adder, and having as an output the first sinusoidal amplitude signal; and
  (j) a second root extractor having as an input the output of the second adder, and having as an output the second sinusoidal amplitude signal 9. The circuit configuration according to claim 6, wherein said demodulating switching circuit further comprises:
  (a) a first integrator having as an input the first output of the resolver, integrating the fist path-dependent AM sinusoidal voltage, and having as an output a first integrated AM sinusoidal voltage;
  (b) a second integrator having as an input the second output of the resolver, integrating the second path-dependent AM sinusoidal voltage, and having as an output a second integrated AM sinusoidal voltage;
  (c) a first absolute value generator having as an input the first output of the resolver, and having an output;
  (d) a second absolute value generator having as an input the output of the first integrator, and having an output;
  (e) a third absolute value generator having as an input the second output of the resolver, and having an output;
  (f) a fourth absolute value generator having as an input the output of the second integrator, and having an output;
  (g) a first vector analyzer having as a first input the output of said first absolute value generator, having as a second input the output of said second absolute value generator, and having an output;
  (h) a second vector analyzer having as a first input the output of said third absolute value generator, having as a second input the output of said fourth absolute value generator, and having an output;
  (i) a first converter having as an input the output of the first vector analyzer, and having as an output the first sinusoidal amplitude signal; and
  (j) a second converter having as an input the output of the second vector analyzer, and having as an output the second sinusoidal amplitude.

* * * * *